United States Patent
Sunami

(10) Patent No.: US 10,545,707 B2
(45) Date of Patent: Jan. 28, 2020

(54) IMAGE FORMING SYSTEM, INFORMATION PROCESSING APPARATUS, AND IMAGE FORMING METHOD THAT PREVENTS PRINTING

(71) Applicant: KYOCERA Document Solutions Inc., Osaka (JP)

(72) Inventor: Wataru Sunami, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/210,527

(22) Filed: Dec. 5, 2018

(65) Prior Publication Data
US 2019/0171401 A1  Jun. 6, 2019

(30) Foreign Application Priority Data
Dec. 5, 2017 (JP) ................................ 2017-233495

(51) Int. Cl.
*G06F 15/00* (2006.01)
*G06F 3/12* (2006.01)
*G06K 1/00* (2006.01)

(52) U.S. Cl.
CPC .......... *G06F 3/1267* (2013.01); *G06F 3/1268* (2013.01); *G06F 3/1288* (2013.01); *G06F 3/1204* (2013.01)

(58) Field of Classification Search
CPC .... G06F 3/1267; G06F 3/1268; G06F 3/1288; G06F 3/1204
USPC ................................ 358/1.15, 1.13, 1.14, 1.1
See application file for complete search history.

(56) References Cited

U.S. PATENT DOCUMENTS

| | | | |
|---|---|---|---|
| 2003/0179406 A1* | 9/2003 | Seto | H04N 1/00132 358/1.15 |
| 2014/0176997 A1* | 6/2014 | Adachi | G06F 3/1237 358/1.15 |
| 2019/0061379 A1* | 2/2019 | Saito | B41J 13/0018 |

FOREIGN PATENT DOCUMENTS

JP  2007-148580 A  6/2007

* cited by examiner

*Primary Examiner* — Douglas Q Tran
(74) *Attorney, Agent, or Firm* — Hawaii Patent Services; Nathaniel K. Fedde; Kenton N. Fedde

(57) ABSTRACT

To provide an image forming system capable of preventing printing that is not intended by a user, an image forming system includes a server capable of storing image data and an image forming apparatus connected to the server via a network and configured to form an image. The image forming apparatus includes an inquiring unit, a determining unit, a requesting unit, and an instructing unit. The inquiring unit is configured to inquire the server for a printing condition of the image data in a case where an input of a registration ID is accepted by an accepting unit, the printing condition being registered in association with the image data. The requesting unit is configured to request the server for downloading of the image data in a case where the determining unit determines that the image forming apparatus conforms with the printing condition. The instructing unit is configured to control an image forming unit to form the image on a sheet, based on the image data downloaded from the server.

10 Claims, 3 Drawing Sheets

IMAGE FORMING SYSTEM, INFORMATION PROCESSING APPARATUS, AND IMAGE FORMING METHOD THAT PREVENTS PRINTING

INCORPORATION BY REFERENCE

This application is based upon, and claims the benefit of priority from, corresponding Japanese Patent Application No. 2017-233495 filed in the Japan Patent Office on Dec. 5, 2017, the entire contents of which are incorporated herein by reference.

BACKGROUND

Field of the Invention

This disclosure relates to an image forming system, an information processing apparatus, and an image forming method.

Description of Related Art

A technique relating to an image formation via a network is known.

SUMMARY

In one aspect of this disclosure, an image forming system includes a server capable of storing image data and an image forming apparatus connected to the server via a network and configured to form an image.

The image forming apparatus includes an image forming unit, an accepting unit, an inquiring unit, a receiving unit, a determining unit, a requesting unit, and an instructing unit. The image forming unit is configured to form the image on a sheet, based on the image data. The accepting unit is configured to accept an input of a registration ID, which is registered in association with the image data. The inquiring unit is configured to inquire the server for a printing condition of the image data in a case where the input of the registration ID is accepted by the accepting unit, the printing condition being registered in association with the image data. The receiving unit is configured to receive the printing condition, which is transmitted from the server. The determining unit is configured to determine whether the image forming apparatus conforms with the printing condition received by the receiving unit. The requesting unit is configured to request the server for downloading of the image data in a case where the determining unit determines that the image forming apparatus conforms with the printing condition. The instructing unit is configured to control the image forming unit to form the image on the sheet, based on the image data downloaded from the server.

The server includes a storage unit, a first transmitting unit, and a downloading unit. The storage unit is configured to store the registration ID and the printing condition in association with the image data. The first transmitting unit is configured to transmit the printing condition to the image forming apparatus in a case where the inquiring unit inquires for the printing condition. The downloading unit is configured to control the image forming apparatus to download the image data in a case where the requesting unit requests for downloading of the image data.

In another aspect of this disclosure, an information processing apparatus is capable of storing image data and is connected via a network to an image forming apparatus that forms an image. The information processing apparatus includes a storage unit, an acquiring unit, a determining unit, and a downloading unit. The storage unit is configured to store a registration ID and a printing condition in association with the image data. The acquiring unit is configured to acquire a printing condition of the image forming apparatus in response to a request from the image forming apparatus for downloading of the image data. The determining unit is configured to determine whether the printing condition of the image forming apparatus, which is acquired by the acquiring unit, conforms with the printing condition stored in the storage unit in association with the image data. The downloading unit is configured to control the image forming apparatus to download the image data in a case where the determining unit determines that the printing condition acquired by the acquiring unit conforms with the printing condition stored in the storage unit.

In another aspect of this disclosure, in an image forming method, an image is formed by use of a server capable of storing image data and an image forming apparatus connected to the server via a network and configured to form an image. The image forming method includes accepting, inquiring, receiving, determining, requesting, forming an image on a sheet, storing, transmitting a printing condition, and controlling to download. In the accepting, an input of a registration ID, which is registered in association with the image data, is accepted by the image forming apparatus. In the inquiring, the server is inquired for a printing condition of the image data in a case where the input of the registration ID is accepted, the printing condition being registered in association with the image data. In the receiving, the printing condition, which is transmitted from the server, is received by the image forming apparatus. In the determining, whether the image forming apparatus conforms with the received printing condition is determined. In the requesting, the server is requested for downloading of the image data in a case where it is determined that the image forming apparatus conforms with the printing condition. In the forming, the image is formed on the sheet, based on the image data downloaded from the server. In the storing, the registration ID and the printing condition is stored in the server in association with the image data. In the transmitting, the printing condition is transmitted to the image forming apparatus in a case where the server is inquired for the printing condition. In the controlling to download, the image forming apparatus is controlled to download the image data in a case where the server is requested for downloading of the image data.

DETAILED DESCRIPTION OF THE INVENTION

Figure 1:
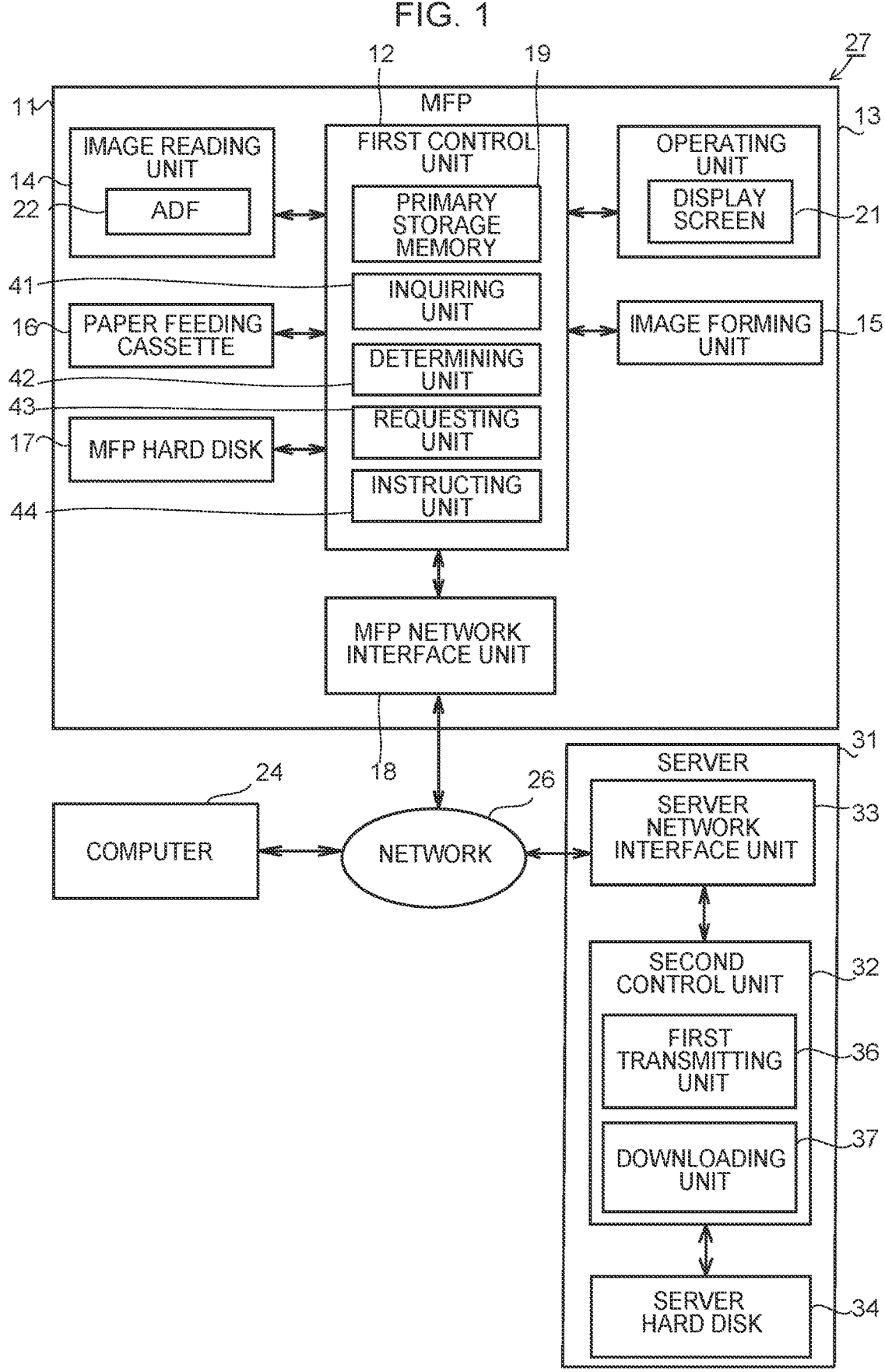
FIG. 1 is a block diagram illustrating a configuration of an image forming system according to an embodiment of this disclosure.

Below is an explanation of an embodiment of this disclosure. Note that the same reference signs are assigned to the parts below that are common or correspond to each other in the drawings, so that explanations thereof are not repeated.

FIG. 1 is a block diagram illustrating a configuration of an image forming system according to an embodiment of this disclosure; As illustrated in FIG. 1, an image forming system 27 according to an embodiment of this disclosure includes: a multifunction peripheral (MFP) 11 as an image forming apparatus; a server 31 connected to the MFP 11 via a network 26; and a computer 24 connected to the network 26. The server 31 may be configured to exist on what is termed as cloud. The computer 24 is capable of registering image data or the like on the server 31 via the network 26, that is, capable of storing image data in the server 31.

Here, firstly, a configuration of the MFP 11 is explained. Relating to image processing, the MFP 11 has multiple functions such as a copy function, a printer function, and a facsimile function. The MFP 11 includes: a first control unit 12; an operating unit 13; an image reading unit 14; an image forming unit 15; a paper feeding cassette 16; an MFP hard disk 17 serving as a storage unit; and an MFP network interface unit 18 that functions as a receiving unit and is for connecting to the network 26. The MFP 11 is installed, for example, in a convenience store. In this case, the network 26 is the Internet.

The first control unit 12 includes a primary storage memory 19 for temporarily storing data and is configured with a processor, a RAM (Random Access Memory), a ROM (Read Only Memory), and the like. The processor is a CPU (Central Processing Unit), an ASIC, an MCU, or the like. The first control unit 12 functions as a below-described inquiring unit 41, etc., and entirely controls the MFP 11 when a control program stored in the above-described ROM or primary storage memory 19 is executed by the above-described processor. Note that each component of the first control unit 12 as described above may be configured with a hardware circuit, not by operation based on the above-described control program.

The operating unit 13 accepts an input from a user relating to image formation, e.g., conditions for image formation such as the number of printing copies and gradation. The operating unit 13, which operates as an accepting unit, accepts an input of a registration ID, which is registered in association with image data. The operating unit 13 includes a display screen 21 serving as a display unit that displays information transmitted from the MFP 11 and a content input by a user. The image reading unit 14 includes an ADF (Auto Document Feeder) 22 serving as a document conveying device that conveys a document set at a setting position to a reading position. The image reading unit 14 reads the image of a document set on the ADF 22 or a platen for placing a document. The sheet feeding cassette 16 is capable of accommodating multiple sheets on the inside. Based on image data of a document read by the image reading unit 14 or image data transmitted via the network 26, the image forming unit 15 forms and prints an image on a sheet conveyed from the sheet feeding cassette 16. The MFP hard disk 17 stores data relating to image formation such as received image data, which is transmitted from the server 31, and an image forming condition that has been input.

Furthermore, the first control unit 12 includes an inquiring unit 41, a determining unit 42, a requesting unit 43, and an instructing unit 44. In a case where the operating unit 13 accepts an input of a registration ID, the inquiring unit 41 inquires the server 31 for a printing condition of image data, which is registered in association with the image data. The MFP network interface unit 18, which operates as a receiving unit, receives the printing condition, which is transmitted from the server 31. The determining unit 42 determines whether the MFP 11 conforms with the received printing condition. In a case where the determining unit 42 determines that the MFP 11 conforms with the printing condition, the requesting unit 43 requests the server 31 for downloading of the image data. The instructing unit 44 controls the image forming unit 15 to form an image on a sheet, based on the image data downloaded from the server 31.

Next, below is an explanation of a configuration of the server 31. The server 31 includes a CPU, etc. Further, the server 31 includes: a second control unit 32 that controls the server 31 itself; a server network interface unit 33 for connecting to the network 26; and a server hard disk 34 serving as a storage unit, which stores data such as image data. The second control unit 32 has the same type of configuration as the above-described first control unit 12. That is, the second control unit 32 includes a primary storage memory for temporarily storing data and is configured with a processor, a RAM (Random Access Memory), a ROM (Read Only Memory), and the like. The processor is a CPU (Central Processing Unit), an ASIC, an MCU, or the like. The second control unit 32 functions as a below-described downloading unit 37, etc., and entirely controls the server 31 when a control program stored in the above-described ROM or primary storage memory is executed by the above-described processor. Note that each component of the second control unit 32 as described above may be configured with a hardware circuit, not by operation based on the above-described control program.

Here, in the server hard disk 34, a registration ID and a printing condition are stored in association with each image data. That is, for example, in association with image data X, registration ID "123" and printing condition "Y" are registered and stored. Printing condition "Y" is a printing condition indicating, for example, that the manufacturing year of the MFP 11 is within three years, that it is within three months from the last maintenance, and that a toner guarantee is granted.

Next, below is an explanation of a specific configuration of the second control unit 32. The second control unit 32 includes a first transmitting unit 36 and a downloading unit 37. In a case of an inquiry from the inquiring unit 41 for a printing condition, the first transmitting unit 36 is controlled to transmit a printing condition to the MFP 11. In a case of a request from the requesting unit 43 for downloading of image data, the downloading unit 37 controls the MFP 11 to download the image data. The configurations of the above units are described later in detail.

Figure 2:
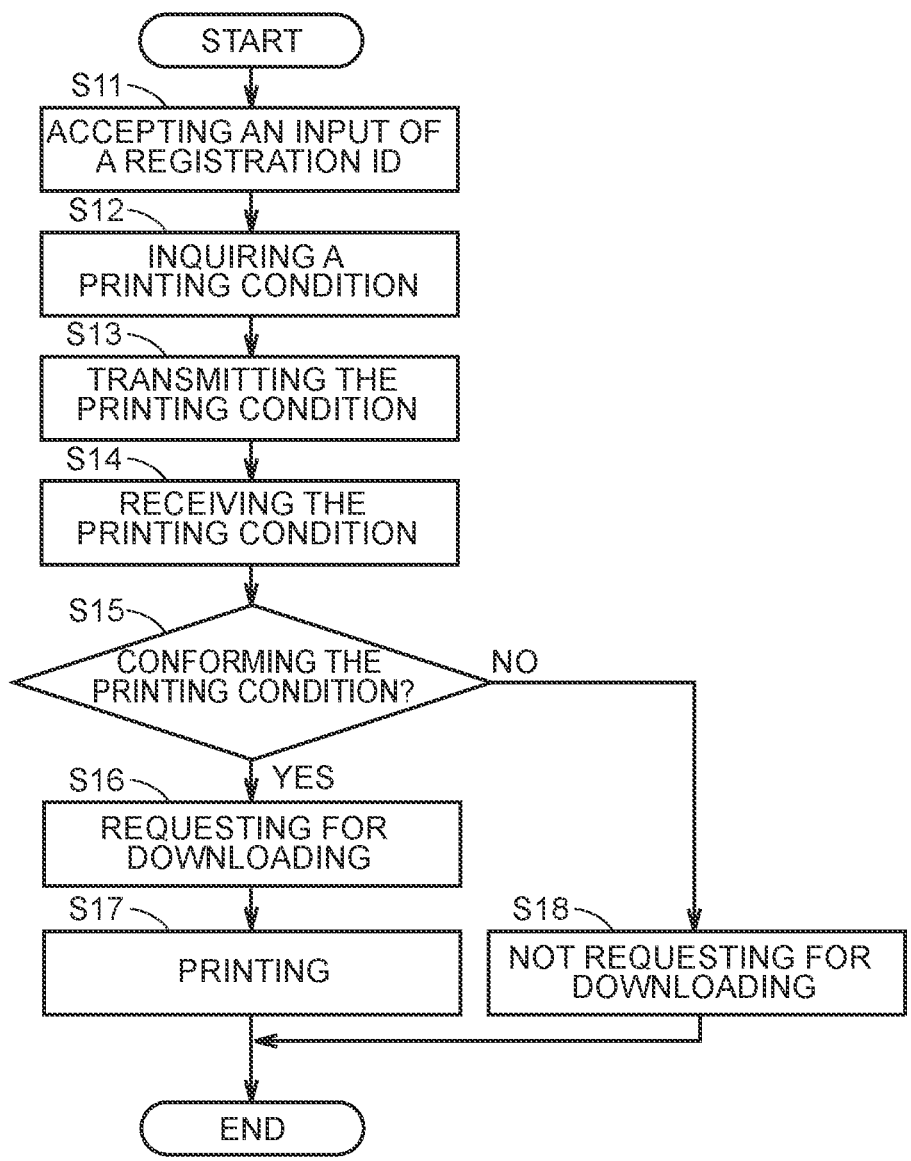
FIG. 2 is a flowchart illustrating a processing flow in a case of downloading image data from a server to a multi-function peripheral and forming an image on a sheet in an image forming system according to an embodiment of this disclosure.

Next, below is an explanation of a processing flow in a case of downloading image data from the server 31 to the MFP 11 and forming an image on a sheet in the image forming system 27. FIG. 2 is a flowchart illustrating the processing flow in a case of downloading image data from the server 31 to the MFP 11 and forming an image on a sheet in the image forming system 27 according to an embodiment of this disclosure.

Here, it is assumed that User A utilizes the computer 24 to register and store registration ID "123" and printing condition "Y" in association with image data X in the server hard disk 34 as described above. Then, User B, who is informed of information of registration ID "123" by User A, utilizes the MFP 11 to perform printing.

With reference to FIG. 2, User B goes to a place where an MFP 11 is installed such as a convenience store. Then, through the operating unit 13, User B inputs registration ID "123", which is informed by User A and is associated with registration of image data X. Then, the operating unit 13 accepts the input of the registration ID, which is registered in association with image data X (Step S11 in FIG. 2. Hereinafter, "Step" is omitted). In this case, the input of registration ID "123" is accepted.

When the operating unit 13 accepts the input of the registration ID, the inquiring unit 41 inquires the server 31 via the network 26 for the printing condition of image data X, which is registered in association with image data X (S12).

When the inquiring unit 41 inquires for the printing condition, the first transmitting unit 36 provided in the second control unit 32 is controlled to transmit the printing condition to the MFP 11 (S13). That is, data of printing condition "Y" stored in the server hard disk 34 in association with image data X is transmitted to the MFP 11 via the network 26.

Then, the MFP network interface unit 18 receives printing condition "Y", which is transmitted from the server 31 (S14). Then, the determining unit 42 determines whether the MFP 11 conforms with the received printing condition "Y" (S15). Specifically, whether the MFP 11 conforms with such a printing condition as the manufacturing year is within three years, it is within three months from the last maintenance, or a toner guarantee is granted, is determined.

Then, in a case where the determining unit 42 determines that the MFP 11 conforms with printing condition "Y" (YES in S15), the requesting unit 43 requests the server 31 for downloading of image data X (S16). Then, the instructing unit 44 controls the image forming unit 15 to form, or to print, an image on a sheet, based on image data "X" downloaded from the server 31 (S17).

Contrarily, in a case where the determining unit 42 determines that the MFP 11 does not conform with printing condition "Y" (NO in S15), the requesting unit 43 terminates the processing without requesting the server 31 for downloading of image data "X" (S18).

According to such an image forming system 27 as above, image data X is downloaded to the MFP 11 and an image is formed on a sheet, based on image data X, after it is determined that the MFP 11 conforms with printing condition "Y". That is, in a case where the determining unit 42 determines that the MFP 11 does not conform with printing condition "Y", the requesting unit 43 terminates the processing without requesting for downloading image data "X". Therefore, it is possible to reliably perform printing as intended by a user.

Furthermore, the image forming method according to this disclosure is an image forming method in which an image is formed by use of a server 31, which is capable of storing image data, and an MFP 11 serving as an image forming apparatus, which is connected to the server 31 via a network 26 and forms an image. The image forming method includes a step of accepting, a step of inquiring, a step of receiving, a step of determining, a step of requesting, a step of controlling to from an image on a sheet, a step of storing, a step of controlling to transmit a printing condition, and a step of controlling to download. In the step of accepting, an input of a registration ID, which is registered in association with image data, is accepted by the MFP 11. In the step of inquiring, in a case where the input of the registration ID is accepted, the server 31 is inquired for the printing condition of the image data, which is registered in association with the image data. In the step of receiving, the MFP 11 receives the printing condition transmitted from the server 31. In the step of determining, whether the MFP 11 conforms with the received printing condition is determined. In the step of requesting, in a case where it is determined that the MFP 11 conforms with the printing condition, the server 31 is requested for downloading of the image data. In the step of controlling to form an image on a sheet, a control to form an image on a sheet, based on the image data downloaded from the server 31, is performed. In the step of storing, the registration ID and the printing condition are stored in the server 31 in association with image data. In the step of controlling to transmit the printing condition, in a case where the server 31 is inquired for the printing condition, a control to transmit the printing condition to the MFP 11 is performed. In the step of controlling to download, in a case where downloading of the image data is requested to the server 31, a control to cause the MFP 11 to download the image data is performed. With such a configuration as above, it is possible to reliably perform printing as intended by a user.

Note that there may be a configuration in which User B is able to access to image data X in the server 31 and check the printing condition before issuing a print request to the MFP 11. With this configuration, it is possible to search for an MFP 11 that conforms with the printing condition of image data X to perform printing with. Furthermore, at least it is possible to determine whether an MFP 11 for usual use conforms with the printing condition.

Furthermore, in the above-described embodiment, in a case where the determining unit 42 determines that the MFP 11 does not conform with printing condition "Y", the processing is terminated without requesting for downloading of image data X. However, this disclosure is not limited thereto, and the image forming system 27 may have the following configuration. That is, in a case where the determining unit 42 determines that the MFP 11 does not conform with the printing condition, the operating unit 13 serving as the accepting unit accepts a change of the printing condition. In a case where a changed printing condition is accepted by the accepting unit, the inquiring unit 41 inquires the server 31 whether to approve the change of the printing condition. In a case where the change of the printing condition, which is inquired by the inquiring unit 41, is approved, the requesting unit 43 requests the server 31 for downloading of the image data. The above configuration is possible.

Figure 3:
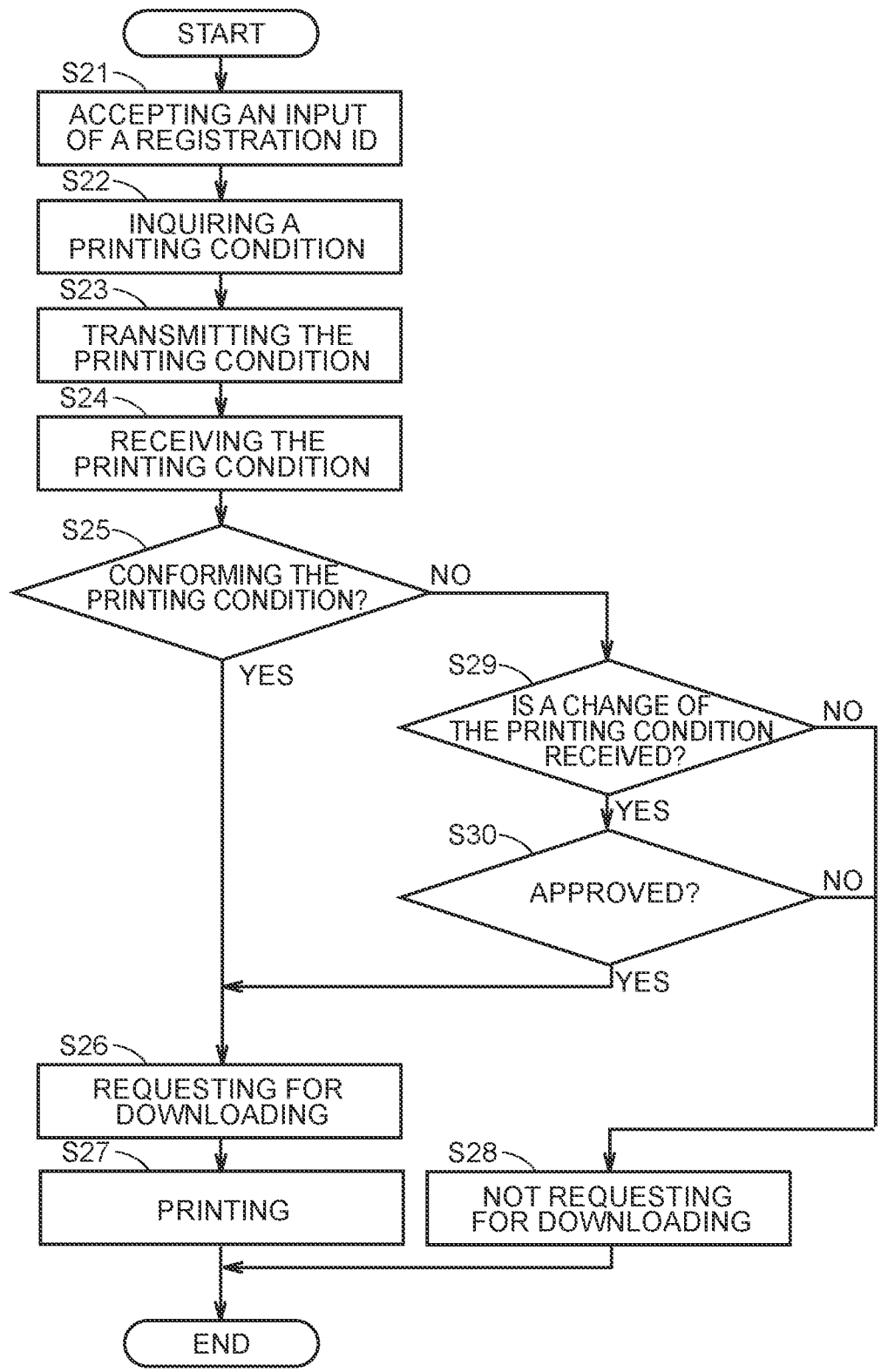
FIG. 3 is a flowchart illustrating a processing flow in a case of downloading image data from a server to a multi-function peripheral and forming an image on a sheet in an image forming system according to another embodiment of this disclosure.

FIG. 3 is a flowchart illustrating a processing flow in a case of downloading image data from the server 31 to the MFP 11 and forming an image on a sheet in an image forming system 27 according to another embodiment of this disclosure.

As illustrated in FIG. 3, since the processing of S21 to S28 is similar to the processing of S11 to S18 illustrated in FIG. 2, explanation thereof is omitted. Here, in S25, in a case where the determining unit 42 determines that the MFP 11 does not conform with a printing condition (NO in S25), the accepting unit accepts a change of the printing condition (S29). The change of the printing condition is performed, for example, on the display screen 21 of the operating unit 13. In this case, specifically, for example, the condition of the manufacturing year is changed from within 3 years into within 6 years. In a case where a changed printing condition is accepted by the accepting unit (YES in S29), the inquiring unit 41 inquires the server 31 and User A via the network 26 whether to approve the change of the printing condition (S30). Here, for example, the server 31 further inquires User A via the network 26 whether to approve the change of the printing condition. Then, in a case where the change of the printing condition "Y", which is inquired by the inquiring unit 41, is approved (YES in S30), the requesting unit 43 requests the server 31 for downloading of image data X (S26). Then, downloaded image data X is printed under the changed printing condition (S27).

With this configuration, User B can obtain a printing object on which an image is formed, based on image data X, with an agreement from User A on the change of the printing condition.

Note that, in a case where the change of the printing condition, which is inquired by the inquiring unit 41, is not approved (NO in S30), the requesting unit 43 may terminate the processing without requesting the server 31 for downloading of image data X (S28). In this way, it is possible to achieve printing intended by User A. Further, in a case where the change of the printing condition in not accepted (NO in S29), the processing is terminated without executing the download as well (S28).

Furthermore, in the above embodiment, when the change of the printing condition, which is inquired for by the inquiring unit 41, is approved, the downloading unit 37 may be controlled, at the time of downloading image data X to the MFP 11, to add a mark indicating prohibition of at least one of duplicating and scanning of a printing object, in which an image is formed based on the downloaded image data, and to download the image data. In this way, for example, it is possible to prevent a printing object with low quality, which is not intended by User A, from spreading. For example, the mark may be added as a digital watermark or may be added as an image on the outside of the imaging area corresponding to image data X.

Furthermore, there may be the following configuration. In the configuration, the MFP 11 further includes a second transmitting unit that transmits an image of a printing object. For example, operation of the second transmitting unit may be transmission, etc., of an image read by the ADF 22 to another computer via the network 26. In a case of detecting that the second transmitting unit transmits an image of a printing object, the inquiring unit 41 inquires whether to approve the transmission of the image of a printing object. In a case where the transmission of the image of a printing object is approved in response to the inquiry from the inquiring unit 41, the second transmitting unit is controlled to transmit the image of a printing object. With this configuration, it is possible to transmit a printing object, based on an agreement from User A.

Note that in the above-described embodiment, there may be a configuration in which the MFP 11 further includes a notifying unit so that, in a case where the determining unit 42 determines that the MFP 11 does not conform with a printing condition, the notifying unit notifies of information indicating an MFP that conforms with the printing condition. In this way, it is possible to attend to needs of User B to download and print image data X. In this case, the notification may be made by inquiring for a printing condition of another MFP that is connected via the network 26 and, for example, displaying the inquiry result on the display screen 21 of the operating unit 13.

Furthermore, in the above-described embodiment, there may be a configuration in which the requesting unit 43 is controlled to request the server 31 for downloading of image data X regardless of a determination result of the determining unit 42 and, in a case where the determining unit 42 determines that the MFP 11 conforms with a printing condition, the instructing unit 44 is controlled to cause the image forming unit 15 to form an image on a sheet, based on the image data downloaded from the server 31. In this way, while downloading of image data X is completed, it is possible to form an image on a sheet, based on a determination result of the determining unit 42. Therefore, in a case where the MFP 11 newly conforms with a printing condition, e.g., in a case where a printing condition is not cleared due to a maintenance period but once a maintenance is carried out, printing is possible based on image data X without downloading.

Furthermore, the server serving as an information processing apparatus according to this disclosure may have the following configuration. That is, a server as an information processing apparatus is capable of storing image data and is connected via a network to an MFP that forms an image. The server includes a storage unit, an acquiring unit, a determining unit, and a downloading unit. The storage unit stores a registration ID and a printing condition in association with image data. In response to a request from an image forming apparatus for downloading of the image data, the acquiring unit acquires the printing condition of the image forming apparatus. The determining unit determines whether the printing condition of the image forming apparatus, which is acquired by the acquiring unit, conforms with a printing condition stored in the storage unit in association with the image data. In a case where the determining unit determines that the printing condition of the image forming apparatus conforms with the printing condition stored in the storage unit in association with the image data, the downloading unit controls the image forming apparatus to download the image data. In this way, it is possible for the server to determine whether the printing condition of the image forming apparatus conforms with the printing condition stored in the storage unit in association with the image data so as to control availability of downloading. Therefore, it is possible to reliably perform printing as intended by a user.

Noted that it should be understood that the embodiment disclosed herein is entirely an example and is not limitative in terms of any aspect. The scope of this disclosure is not defined by the above explanation but by the claims, and it is intended that all modifications within meaning and a scope equivalent to the claims are included.

The image forming system, the information processing apparatus, and the image forming method according to this disclosure are particularly effective for use in a case where it is required to reliably perform printing as intended by a user.

What is claimed is:

1. An image forming system comprising: a server capable of storing image data; and an image forming apparatus connected to the server via a network and configured to form an image,
wherein the image forming apparatus includes:
an image forming unit configured to form the image on a sheet, based on the image data;
an accepting unit configured to accept an input of a registration ID, which is registered in association with the image data;
an inquiring unit configured to inquire the server for a printing condition of the image data in a case where the input of the registration ID is accepted by the accepting unit, the printing condition being registered in association with the image data;
a receiving unit configured to receive the printing condition, which is transmitted from the server;
a determining unit configured to determine whether the image forming apparatus conforms with the printing condition received by the receiving unit;
a requesting unit configured to request the server for downloading of the image data in a case where the determining unit determines that the image forming apparatus conforms with the printing condition; and an instructing unit configured to control the image forming unit to form the image on the sheet, based on the image data downloaded from the server, and wherein the server includes:

a storage unit configured to store the registration ID and the printing condition in association with the image data;

a first transmitting unit configured to transmit the printing condition to the image forming apparatus in a case where the inquiring unit inquires for the printing condition; and a downloading unit configured to control the image forming apparatus to download the image data in a case where the requesting unit requests for downloading of the image data.

2. The image forming system according to claim 1, wherein the requesting unit terminates processing without requesting for downloading of the image data in a case where the determining unit determines that the image forming apparatus does not conform with the printing condition.

3. The image forming system according to claim 1, wherein the accepting unit accepts a change of the printing condition in a case where the determining unit determines that the image forming apparatus does not conform with the printing condition, wherein the inquiring unit inquires the server whether to approve the change of the printing condition in a case where the accepting unit accepts the printing condition which has been changed, and wherein the requesting unit requests the server for downloading of the image data in a case where the change of the printing condition is approved, the change of the printing condition being inquired for by the inquiring unit.

4. The image forming system according to claim 3, wherein the requesting unit terminates processing without requesting for downloading of the image data in a case where the change of the printing condition is not approved, the change of the printing condition being inquired for by the inquiring unit.

5. The image forming system according to claim 3, wherein, in the case where the change of the printing condition, which is inquired for by the inquiring unit, is approved, the downloading unit attaches a mark to a printing object when controlling the image forming apparatus to download the image data, the image being formed in the printing object based on the downloaded image data, the mark indicating prohibition of at least one of duplicating and scanning of the printing object.

6. The image forming system according to claim 5, wherein the image forming apparatus further includes a second transmitting unit configured to transmit an image of the printing object, wherein, in a case where transmission of the image of the printing object, which is performed by the second transmitting unit, is detected, the inquiring unit inquires whether to approve the transmission of the image of the printing object, and wherein, in a case where the transmission of the image of the printing object, which is inquired for by the inquiring unit, is approved, the second transmitting unit is controlled to transmit the image of the printing object.

7. The image forming system according to claim 1, wherein the image forming apparatus further includes a notifying unit configured to notify of information about another image forming apparatus in a case where the determining unit determines that the image forming apparatus does not conform with the printing condition, the said another image forming apparatus conforming with the printing condition.

8. The image forming system according to claim 1, wherein the requesting unit requests the server for downloading of the image data regardless of a determination result of the determining unit, and wherein, in the case where the determining unit determines that the image forming apparatus conforms with the printing condition, the instructing unit controls the image forming unit to form the image on the sheet, based on the image data downloaded from the server.

9. An information processing apparatus capable of storing image data and connected via a network to an image forming apparatus that forms an image, the information processing apparatus comprising:

a storage unit configured to store a registration ID and a printing condition in association with the image data;

an acquiring unit configured to acquire a printing condition of the image forming apparatus in response to a request from the image forming apparatus for downloading of the image data;

a determining unit configured to determine whether the printing condition of the image forming apparatus, which is acquired by the acquiring unit, conforms with the printing condition stored in the storage unit in association with the image data; and a downloading unit configured to control the image forming apparatus to download the image data in a case where the printing condition acquired by the acquiring unit conforms with the printing condition stored in the storage unit.

10. An image forming method for forming an image by use of a server capable of storing image data and an image forming apparatus connected to the server via a network and configured to form an image, the image forming method comprising:

accepting an input of a registration ID, which is registered in association with the image data, the accepting being performed by the image forming apparatus;

inquiring the server for a printing condition of the image data in a case where the input of the registration ID is accepted, the printing condition being registered in association with the image data;

receiving the printing condition, which is transmitted from the server, the receiving being performed by the image forming apparatus;

determining whether the image forming apparatus conforms with the received printing condition;

requesting the server for downloading of the image data in a case where it is determined that the image forming apparatus conforms with the printing condition;

forming the image on the sheet, based on the image data downloaded from the server;

storing the registration ID and the printing condition in the server in association with the image data;

transmitting the printing condition to the image forming apparatus in a case where the server is inquired for the printing condition; and controlling the image forming apparatus to download the image data in a case where the server is requested for downloading of the image data.

* * * * *